United States Patent Office 3,215,624
Patented Nov. 2, 1965

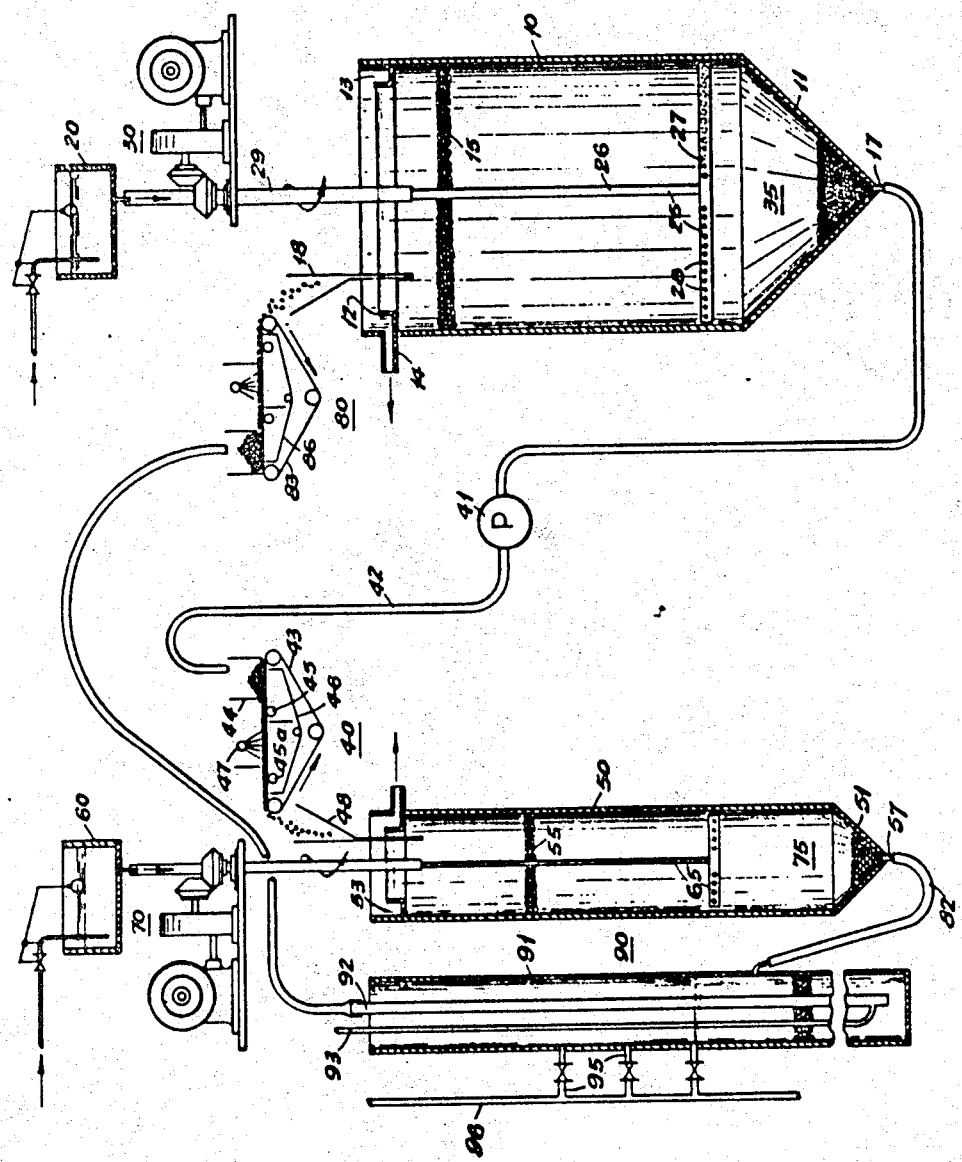

3,215,624
CONTINUOUS ION EXCHANGE APPARATUS
AND PROCESS
Howard W. Frazer, Tucson, Ariz., and Abraham Sidney
Behrman, Chicago, Ill., assignors, by mesne assignments, to Fuller Company, Catasauqua, Pa., a corporation of Delaware
Filed June 30, 1961, Ser. No. 120,946
8 Claims. (Cl. 210—33)

This invention relates to ion exchange and is concerned particularly with apparatus and processes for carrying out ion exchange reactions in continuous systems.

The use of ion exchange reactions—that is, the exchange of an ion in solution for an exchangeable ion of a solid ion exchange material—is now so well-known that no detailed discussion of the subject in general is warranted here. While the most widespread use of the reaction continues to be in "zeolite" or cation exchange water softening for industrial and household purposes, new applications are constantly being developed, such as the recovery of metals from plating wastes, sugar refining, separation of radioactive isotopes, and recovery of uranium and other metals from their ores.

Nearly all ion exchange processes today are carried out as they have been ever since the reaction was first commercialized—that is, there is provided in a suitable column or other container a bed of ion exchange material, and through this bed are passed in proper sequence the liquid to be treated, the wash liquid, the regenerating solution, and any rinse water or other rinse liquid. Depending on whether a treated liquid or the material taken up by the exchanger is the desired end product of an ion exchange operation, it is usual to refer to treating or loading cycles and to regeneration or elution cycles. For convenience the terms "treating" and "regeneration" will be used hereinafter for both types of ion exchange operations.

In the typical plant just described the throughout of liquid being treated must be interrupted, of course, for the washing, regeneration and rinsing steps; and, to meet this situation, it is general practice in industrial installations to have several treating units, with operation suitably staggered so as to provide an uninterrupted supply of treated liquid—although occasionally only one unit may be installed, with sufficient storage of treated liquid to carry through the time required by the washing, regenerating and rinsing steps of the cycle.

The inconvenient and expensive consequences resulting from the necessity for interrupting the productive flow of treated liquid from the conventional ion exchange unit for backwashing, regenerating and rinsing, together with the large amount of labor required for these operations, has led to many attempts to devise a continuous system in which the productive flow of treated liquid is uninterrupted from a single column containing ion exchange material. The production in recent years of ion exchange resins in round bead form has given additional impetus to such efforts. Although several of these attempts have been of considerable interest, none of the proposed continuous systems has come into general use.

A particularly difficult class of liquids to treat in the conventional ion exchange plant described above are the turbid liquids, such as the highly turbid leach liquors obtained in the processing of uranium and other ores. The suspended solids in such liquids will quickly clog any fixed bed of ion exchange material and reduce the flow through the bed to uneconomical amounts. The handling of such turbid liquids in the uranium industry by the "resin-in-pulp" method (in which screened basket containers of ion exchange resin are moved up and down in the liquids) has achieved considerable prominence, and has accomplished a very useful purpose in an emergency; but it is believed that the efficiency and economy of this process leave much to be desired.

Accordingly, the principal object of the present invention is to provide new and useful apparatus and processes for carrying out ion exchange reactions in a truly continuous manner.

Another object of the invention is to provide apparatus and process for the successful continuous ion exchange treatment of turbid liquids.

Another object of the invention is to provide greatly improved uniformity in the results of ion reactions both in the treating and regeneration cycles.

Still another object of the invention is to improve the efficiency of regeneration of exhausted ion exchange material.

Another object is to provide apparatus for continuous ion exchange treatment wherein the liquid flow in the treating step and in the regeneration step is countercurrent to a moving bed of ion exchange material.

Another object is the use of gravity flow of resin slurry for resin intake and discharge in the treating and regeneration units of an ion exchange plant of the type referred to.

Another object is to provide an apparatus for continuous ion exchange of the general type referred to, wherein the exchange material slurry is thickened before its discharge from the treating or the regeneration zone.

Another object of the invention is to provide an ion exchange plant of the continuous type wherein suspended matter in the liquid does not cause the usual steadily increasing clogging of the bed.

Another object is to provide, in an ion exchange plant of the type referred to, for the re-cycling and re-use of regenerant solution separated from the resin discharged from the regeneration zone, and, when warranted by its nature, of liquid separated from the resin discharged from the treating zone.

A particularly important object is to maintain dynamic displacement of equilibrium in an apparatus for continuous ion exchange utilizing a moving bed of exchange material.

Every ion exchange reaction tends to approach equilibrium between the concentration of any particular ion in the liquid with the concentration of the same ion in (or on) the ion exchange resin (or other ion exchanger) particle. When and if equilibrium is reached, the ion exchange reaction stops. This equilibrium varies with the particular ion, the particular resin, the ion concentration, and other factors. In any case, however, it is evident that the ion exchange will take place most readily when the concentration of the ion in the ion exchanger is minimal (preferably approaching zero) compared to the concentration of the ion in the liquid, and will take place less and less readily as the concentration of the ion in the ion exchanger approaches equilibrium with the concentration of the ion in the liquid; simultaneously, of course, there is in the ion exchanger a decreasing amount of the ion (e.g., sodium ion) which is to be exchanged for the ion (e.g., calcium ion) in the liquid.

By the same token, as the concentration of the ion in the liquid is decreased by reason of ion exchange, the equilibrium concentration of the ion will become smaller and smaller, and approach zero as its limit, if we can bring the liquid into contact with more and more completely regenerated ion exchanger in which the concentration of the ion is also smaller and smaller, approaching zero in freshly regenerated material. In other words, by bringing the liquid into contact with more and more completely regenerated material, we are successively shifting or displacing a relatively high equilibrium concentration of the ion in the liquid with a continuously smaller equilibrium concentration, which approaches and may practically equal zero in the absence of other complicating factors.

This phenomenon is referred to in the art by the term "dynamic displacement of equilibrium." In order to maintain this condition, it is necessary to maintain the relative vertical positions of the ion exchange particles and to maintain straight line flow of liquid through the bed.

It is, therefore, another important object of the invention to so conduct continuous ion exchange operations as to maintain the relative vertical positions of the ion exchange particles.

Another object is an apparatus for continuous ion exchange reactions which provides a straight line flow of liquid through the bed.

The manner of attainment of these and other objects of the invention will become apparent on the further reading of this specification and the appended claims.

While the cation or anion exchange materials used in our apparatus and process are preferably resins, other ion exchange materials, such as, for example, the sulfonated coals or siliceous zeolites, in suitable form, can be used. It should be understood, therefore, that the term "resin," used herein sometimes for brevity, denotes any ion exchange material suitable for the particular application to which the invention is put.

Briefly, in our invention, for treating as well as for regeneration, a resin bed is provided in a suitable column or equivalent container. Resin in the form of a concentrated slurry is discharged continually by gravity from a thickening zone in the bottom of the column, which is functionally, but not structurally, separated from the overlying portion of the column, and resin is applied in equal amount by gravity flow at the top of the column. The liquid is brought into the respective unit at a controlled rate through a rotating stirrer-distributor, which is located above the thickening zone. The main flow of the liquid is upward through the resin, countercurrent to the resin flow; a minor quantity of liquid is entrained by the downwardly moving resin bed into the thickening zone.

Thickened resin slurry from the thickening zone of one container is conveyed by any suitable means capable of moving the resin without appreciable attrition to a dewatering and, when indicated, a rinse zone, and is discharged therefrom by gravity onto the top of the resin bed in the other container, and vice versa.

The column is free of partitions, baffles and similar structure which could deflect or obstruct a straight forward flow of liquid and of resin slurry from their points of entry into, to their points of withdrawal from the column. The resulting free, unobstructed countercurrent flow of resin and liquid enhances the uniform contact between resin and liquid over the entire path from the level of discharge of the liquid to the top of the resin bed. Furthermore, a free and unobstructed straight line countercurrent flow is a requisite to the dynamic displacement of equilibrium in the moving bed.

While the regeneration unit is structurally the same as the treating unit, it is typically much smaller. The actual relation of the cross-sectional areas of the two units depends on the conditions in each individual installation. In some cases it may be, for example, of the order of about 1 to 10.

The invention will be more readily understood by reference to the drawing which shows a vertical cross-sectional view of an ion exchange plant according to the invention.

A cylindrical container or column 10 is preferably open at the top and has a conical bottom 11. Treated liquid flows over a weir 12 into an effluent launder 13 and is withdrawn through an outlet conduit 14. A resin bed 15 fills the container to a level sufficiently spaced below the launder 13 to prevent carry-over of resin particles by the effluent. This level varies with the flow rate, the specific gravity of the liquid, and the specific ion exchange material used in individual installations. Resin in appropriate quantity is continuously discharged from the bottom of the column through an outlet 17 and an equal amount of resin is continuously introduced by means of a funnel 18 or the like into the top portion of column 10 at a sufficient depth below the launder 13 to avoid resin particles being carried out with the effluent. Thus a constant bed depth is maintained and the resin bed moves downwardly continuously at an appropriate rate.

The liquid to be treated or influent is introduced at a controlled rate, for example from a constant head tank 20, into the resin bed through a rotating stirrer-distributor 25 comprising a central hollow shaft 26 terminating at the bottom in a cross arm 27 provided with suitable discharge orifices 28, which may be screened. The distributor arm extends substantially across the entire width of said container and is embedded in the resin bed. To minimize attrition of resin by the rotating distributor arm 27, the orifices 28 preferably are arranged on the leading edges of the arm 27, as shown, whereby a cushion of liquid is pushed ahead of the arm. The upper portion 29 of the shaft 26 is wider than its lower portion, to permit the escape of any air entrained by or separated from the liquid which otherwise would be discharged into the resin bed with the liquid and cause a disturbance of the bed by bubbling up through it. The shaft 26 is rotated at a desired speed by a variable speed motor-reducer 30. The speed of rotation may vary considerably; we have used speeds within the range of from 1 r.p.m. (revolutions per minute) to 6 r.p.m., but under proper conditions higher or lower speeds may be used to advantage.

The distributor 25 may be placed at any desired elevation in the resin column, but should be sufficiently above the top of the bed 15 that the resin, when it reaches the distributor in its descent through the column, will be as completely exhausted as practicable in an exhaustion run, and the liquid rising countercurrently to the resin column will be as fully treated as practicable with the quantity of regenerant used when it reaches the weir 12; and the distributor should be sufficiently above the resin outlet 17 to provide a quiescent thickening chamber 35 in the bottom portion of the column 10. The thickening chamber 35 is in open, unrestricted hydraulic communication with the overlying zone, but protected from turbulence set up by the distributor by a sufficient depth of resin. The actual depth of resin above and below the distributor may vary considerably, depending on the treating requirements of individual installations. For example, the distributor may be placed with a 12 to 36 inch depth of resin above it and about 6 inches of resin depth below it.

The resin leaving the column 10 through resin outlet 17 is conveyed to a dewatering device 40. The resin may be lifted to the dewatering device 40 by an air lift, as will be described below in connection with the lifting of regenerated resin from the regeneration column; or, as shown in the drawing, a diaphragm pump 41 may be used to convey the resin through a pipe 42 to the dewatering device. The dewatering device 40 may be of any suitable kind, but preferably a travelling vacuum filter of the type shown diagrammatically in the drawing is used. The resin is discharged onto the travelling filter belt 43 at the receiving end and is formed into a relatively shallow layer by passing underneath a baffle plate 44. As the resin layer travels with the filter belt toward the discharge end, a vacuum is applied below the filter belt through vacuum pipe 45 whereby liquid is withdrawn from the resin and flows through the filter 43 into a separator, not shown. A collecting pan 46 is provided to catch any drainage. Partly dewatered resin may be rinsed, if desired, by jets of liquid directed against the filter surface from nozzles 47 and is then further dewatered by vacuum applied through pipe 45a. At the discharge end of the filter the resin is allowed to drop by gravity into an inlet funnel 48 discharging into a regeneration column 50.

Where the nature of the liquid under treatment warrants, the liquid collected in the separator and in pan 46 may be returned to the process.

As pointed out above, the construction of the regeneration column 50 is practically identical with that of the treating column 10. A resin bed 55 extends from the conical bottom 51 to a suitable level below the spent regenerant outlet 53. Regenerated thickened resin slurry is withdrawn from the bottom of the column through outlet 57 at the rate at which it is introduced at the top. The regenerant, which may be for example an acid solution in the case of hydrogen exchange resins, and an alkaline solution in the case of anion exchange resins, is delivered from a suitable storage container, not shown, at a controlled rate, for example, through a constant head tank 60, into the regeneration column 50 through a rotary stirrer-distributor 65 which is of similar construction as the distributor 25 of the treating column, extends substantially across the entire width of the column 50, and is rotated by a variable speed motor-reducer 70. The distributor 65 is located in the resin bed 55 sufficiently below the top of the bed that the resin particles reaching the distributor in their descent are as fully regenerated as possible with the quantity and concentration of regenerant used, and the regenerant reaching the outlet 53 is substantially completely spent. Depending on the character of the material taken up by the resin in the treating step, the regenerant is withdrawn to waste or to further appropriate processing. The distributor 65 is spaced above the resin outlet 57 sufficiently to form a quiescent thickening chamber 75 in the lower portion of column 50. Thickening chamber 75 is in open, unrestricted hydraulic communication with the overlying portion of column 50.

The regenerated resin discharged from the column 50 is conveyed to a dewatering and rinse device 80 of any suitable kind, such as a travelling filter 83 of the type described above in connection with the dewatering and rinsing of spent resin. The resin may be pumped to the dewatering device 80 by a diaphragm pump, such as pump 41, or as shown in the drawing, the resin may be transported by means of an air lift 90. The air lift 90 comprises a cylindrical open-top, closed-bottom tube 91 receiving resin from column 50 through outlet 57 and a pipe 82; an open-ended conduit 92 in tube 91, and leading from a point near the bottom of the tube 91 to the receiving end of the travelling filter 83; and an air pipe 93 connected to a suitable source of air under pressure, not shown.

To maintain a constant rate of discharge of resin from the tube 91, a constant head is maintained over the inlet end of the pipe 92. To this end a number of valved outlet conduits 95 may be provided at different elevations of the tube 91 and lead to a pipe 96. By selectively opening one of the valves on the conduits 95, a predetermined head can be maintained, any excess of liquid over the desired head flowing into the pipe 96.

Air discharge from air pipe 93 into the tube 92 lifts resin from the bottom portion of the tube 91 and conveys it to the dewatering device 80, where the resin is dewatered and rinsed. Regenerant withdrawn from the resin is collected in a receiver, not shown. Any drainage is received by a pan 86. Dewatered and rinsed resin drops by gravity from the filter 83 into the funnel 18 and returns to the resin bed 15 in the column 10.

Regenerant solution collected by the receiver and in the pan 86 of the dewatering device 80 and in pipe 96 may be returned for further use individually or jointly to the constant head tank 60 or other regenerant supply tank through any suitable connections, not shown. In some cases, particularly if the recovered regenerant solution from these sources is not only dilute, but also somewhat contaminated, it may be desirable to store the recovered solution separately, in any suitable tank, not shown, and to apply this recovered solution to the resin first, followed by completely fresh solution.

In operation of the treating unit, regenerated resin is continuously introduced into the top of column 10 at a controlled rate, and spent resin is continuously withdrawn at the same rate from the bottom of the column. The liquid to be treated is discharged into the downwardly moving resin bed at a predetermined constant rate through the rotating stirrer-distributor 25 which is embedded in the resin bed and distributes the liquid over the entire cross-sectional area of the column 10. The main portion of the liquid rises from the region of introduction to the weir 12, countercurrently to the flow of the resin bed, and is withdrawn through the launder 13 and effluent conduit 14. A fraction of the liquid discharged by the stirrer-distributor 25 into the region of introduction is entrained by the resin bed and enters the thickening zone or chamber 35 in the bottom portion of the column 10. As the liquid flows upwardly to the launder 13, it comes in successive contact with resin of increasing exchange capacity, from the substantially exhausted resin which has descended to the distributor, to the freshly regenerated resin at the top of the bed. Thus, the full benefits of countercurrent flow are obtained.

The rate of flow of liquid upward through the resin bed may be so low that the expansion of the bed is practically zero, in which case the relative vertical positions of the resin particles are obviously unchanged; or the upward flow may be sufficiently high to expand the bed appreciably, it which case it is preferred to limit the rate of flow and resultant expansion of the bed sufficiently to prevent any appreciable displacement of the relative vertical positions of the resin particles in the bed. In either case, therefore, the full value of dynamic displacement of equilibrium characteristic of fixed bed operation is obtained with a moving bed. We have found that at flow rates of approximately 1 gal./min./sq. ft. the relative vertical positions of the resin particles in the bed could be maintained unchanged when operating with water and cation resin of 20–50 mesh size, such as a resin prepared according to Patent No. 2,366,007. If the required flow rate is too high to maintain the relative vertical positions of the resin particles unchanged, then a portion of the effluent may be recycled to the top of the bed. This downward pressure will prevent the disturbance of the relative vertical positions of the resin particles. Under ordinary conditions, however, such recycling will not be necessary.

The rotation of the distributor and the localized high rate of flow at its discharge orifices create a narrow zone of turbulence immediately above the distributor, but there is practically no turbulence below it. The space below the distributor in the conical bottom 11 of the column 10, therefore, forms a relatively quiescent thickening chamber 35, wherein a liquid-solids separation takes place and a resin slurry of downwardly increasing concentration is formed. This permits the withdrawal of resin slurry in thickened form which is important for the economics of the process, particularly when using anion exchange resins which are typically characterized by low density and fine particle size and by the ease with which they become fluidized. The thickened slurry may have a concentration of about 75% by volume wet settled resin.

The turbulence set up in the region of introduction of the liquid in the immediate vicinity of the stirrer-distributor 25 serves to improve the uniformity of distribution above the distributor, and conditions and also cleanses, when necessary, the resin for thickening and concentration before its discharge to the dewatering, rinsing and regeneration zones, as will be discussed in greater detail below, in connection with the handling of turbid liquids.

The thickened slurry of spent resin is conveyed from the bottom of the thickening chamber 35 to the dewatering and washing device 40 and thence drops by gravity into the top of the regeneration column 50.

The operation in the regeneration step is similar to that of the treating step and similar advantages are obtained. Regenerate solution enters the regeneration column 50 at a predetermined rate through the rotary stirrer-distributor 65 and is distributed over the entire cross-sectional area of the column. The main flow is upward to the spent regenerant outlet 53, while a portion of the influent liquid flows with the resin and enters therewith the thickening zone or chamber 75. If desired, this downward flow of regenerant solution can be prevented by introducing a small blocking flow of liquid through a suitable distributor (not shown) below distributor 65.

What has been said with regard to the advantages of thickening the resin slurry before withdrawal from the treating column applies equally well to thickening of the resin slurry in the regeneration column.

As the regenerant solution introduced through distributor 65 rises countercurrently to the downwardly moving resin bed to the outlet 53, it comes in contact successively with resin of decreasing exchange capacity, from the substantially fully regenerated resin at the level of the rotary distributor to the practically spent resin at the top of the bed. Thus, also in the regeneration step, the full benefits of countercurrent flow are obtained.

The localized high rate of flow at the discharge openings of the distributor 65 creates a narrow zone of turbulence in the immediate vicinity of the distributor, as described in connection with the operation of distributor 25. This localized turbulence is beneficial to the operation of the regeneration unit by largely contributing to the uniformity of distribution of the regenerant and by conditioning the resin for concentration in the thickening chamber 75.

Exact control of the flow rate is also of importance in the regeneration step to maintain the relative vertical positions of the resin particles and thus obtain with a moving bed the advantages inherent in fixed bed regeneration.

Thickened regenerated resin slurry is withdrawn from the regeneration column 50 through outlet 57 and conveyed to the device 80, where it is dewatered and rinsed, and then returns by gravity into the top of the treating column 10.

The following example describes details of a typical test run and its results.

EXAMPLE

In the regeneration column the distributor was arranged with a resin depth of 12" above and 6" below the distributor and was rotated at 6 r.p.m.

Resin prepared according to Patent No. 2,366,007 of 20–50 mesh size was used and was regenerated with 4.03% $H_2SO_4$.

| Acid Feed Rate | G.p.m./sq. ft. | Lbs. of 100% $H_2SO_4$ per c.f. of resin |
|---|---|---|
| Total | 0.58 | 7.25 |
| Upflow | 0.43 | 5.4 |
| Downflow | 0.15 | 1.85 |

Strength of spent upflow acid=1.22% $H_2SO_4$=30.5% of feed acid strength
Strength of recovered downflow acid=3.4% $H_2SO_4$=85% of feed acid strength

*Resin feed and discharge rate*

Net volume of wet settled resin=0.027 cf./sq. ft./min.
Average concentration of resin feed and discharge=78% wet settled resin
Acid recovered for subsequent regeneration=1.57 lbs. of 100% $H_2SO_4$ per cf. of resin

*Resin feed and discharge rate—Continued*

Net acid applied and not recovered=5.68 lbs. of 100% $H_2SO_4$ per cf. of resin
Net capacity realized in subsequent exhaustion run=29.2 kgr. $CaCO_3$ equivalent per cf.
Acid efficiency=0.20 lbs. 100% $H_2SO_4$ per kgr.

In the treating column the distributor was arranged with 12" resin above and 6" below it and was rotated at 6 r.p.m.

A synthetic water was prepared which contained 434 gr./gal. NaCl as $CaCO_3$.
Water feed rate=0.88 g.p.m./sq. ft.
Resin feed and discharge rate=0.00849 cf./sq. ft./min.
Net capacity realized=29.2 kgr./cf.

The capacity and chemical efficiency are considerably better than can be obtained with conventional fixed bed operation on water containing this concetration of sodium chloride. The quality of the treated water was uniform throughout the exhaustion run. The leakage obtained during the run (37%) compares very favorably with the average leakage obtained with fixed beds operating on similar water.

The apparatus and process of this invention are particularly well suited (but obviously not at all limited) to the treatment of turbid liquids. This will be evident from a consideration of the operation with either an expanded or unexpanded resin bed above the distributor. When operating with a partially expanded bed, all or a substantial portion of the suspended particles in the liquid will pass upwardly through the bed and out with the treated liquid. Any suspended particles that have adhered to the resin particles will be carried down and out with the concurrent downward flow of resin and liquid. Furthermore, any coalesced or coagulated aggregates of suspended particles which remain in the resin bed above the distributor will be broken up as that portion of the resin works down into the zone of turbulence and agitation just above the distributor and then into final disintegrating contact with the distributor itself, if any lumps still remain, thus conditioning the resin for thickening and discharge. If, on the other hand, the resin bed is not expanded in operation, then most or all of the suspended particles in the influent liquid may be discharged downwardly with the resin by the same mechanism described above. In either case, the continuous downward movement of the resin bed prevents the steadily increasing clogging of the bed and steadily decreasing rate of flow characteristic of fixed bed operation. In either case also, the rotation of the distributor and the zone of turbulence created by it will break up any lumps of resin tending to be cemented by the suspended particles and will thus condition the resin for discharge.

From the foregoing it will be seen that the most important features of the invention are:

The stirrer-distributor which provides for uniform distribution and treatment of the liquid and resin and conditioning of the resin for thickening. Its construction also solves the problem of rotation of such a device in a resin bed without causing any appreciable resin attrition.

The resin thickening zone which permits the withdrawal of concentrated resin slurry for regeneration and re-use; and The maintenance of the relative vertical positions of the resin particles, whereby the advantages of dynamic displacement of equilibrium characteristics of fixed bed operation are obtained with a moving bed.

The economy of the process is further enhanced by providing means for collecting excess regenerant rinsed or otherwise separated from the regenerated resin for re-use.

It will be understood that the regeneration step may be carried out in the manner, and with equipment, previously used or suggested in the art of continuous ion exchange treatment, without defeating the advantages of the invention with respect to the treating step. Similarly, a regeneration according to the invention can be used with advantage though the treatment is carried out in the manner previously used or suggested for continuous ion exchange. The full benefits of the invention, however, are obtained only by applying it to the entire treating cycle.

Various modifications of the apparatus and process, which will be obvious to those skilled in the art, can be made without departing from the spirit and scope of the invention. Accordingly, we do not wish to limit ourselves to the exact details of the invention shown and described herein for purposes of exemplification and illustration.

This application is a continuation-in-part of our copending application, Serial No. 742,329, now abandoned.

We claim:

1. In an apparatus of the type wherein a liquid flows from a point of entry upwardly, countercurrently to a downwardly moving bed of ion exchange material, to a point of withdrawal, said apparatus including a tank having outlet means for said liquid adjacent its top, means for introducing ion exchange material into said tank at an elevation below said liquid outlet means, and outlet means for ion exchange material from a lower portion of said tank, improved means for introducing said liquid into said tank comprising a rotatably mounted hollow shaft extending into said tank, the upper end portion of said shaft being connected to a source of said liquid, a hollow arm affixed to, and in hydraulic communication with, said shaft and extending horizontally therefrom substantially across the cross-sectional area of said tank, said arm having liquid discharge means along its length, and being embedded within said bed of ion exchange material at an elevation sufficiently spaced above said outlet means for ion exchange material to provide a quiescent thickening zone below said arm in open hydraulic communication with the overlying portion of said tank, and sufficiently spaced below said liquid outlet means to afford substantial completion of the exchange reactions between said liquid and said ion exchange material before said liquid reaches said liquid outlet means, means for controlling the rate of flow from said source of liquid to said hollow shaft to limit turbulence due to the discharge from said liquid discharge means to a narrow zone above said hollow arm, said tank being free of obstructions to a straight line flow of said liquid from said discharge means to said liquid outlet means countercurrently to said resin bed, and means for rotating said shaft.

2. Apparatus according to claim 1, wherein said discharge means are arranged to discharge in the direction of rotation of said arm over the cross-sectional area of said tank.

3. In an apparatus for carrying out continuous ion exchange operations of the type wherein the liquid to be treated flows upwardly countercurrently to a downwardly moving bed of ion exchange material from a point of entry to a point of withdrawal, said apparatus including a tank having treated liquid outlet means in its upper portion, spent resin outlet means in its bottom portion, means for introducing resin into said tank at an elevation intermediate said treated liquid outlet means and said spent resin outlet means, and means for conveying resin from said spent resin outlet means to regeneration and rinsing zones and to return it to said tank through said resin inlet means, improved means for introducing liquid to be treated into said tank, comprising a rotatably mounted hollow shaft extending into said tank, one end portion of said shaft being connected to a source of the liquid to be treated, a distributing arm affixed to, and in hydraulic communication with, said shaft and extending horizontally substantially across the cross-sectional area of said tank, said arm being embedded within said bed of ion exchange material at an elevation remote from said treated liquid outlet means and sufficiently spaced from said spent resin outlet means to provide a quiescent thickening zone between said arm and said spent resin outlet means, said arm having a plurality of orifices arranged in the leading edges of said arm relative to the direction of its rotation, means controlling the rate of discharge of liquid from said orifices to limit the turbulence due to said discharge to a narrow zone above said arm, said tank being free of obstructions to a straight line flow of liquid countercurrently to said moving resin bed from said orifices to the top of said bed, and means for rotating said shaft and said arm.

4. In an apparatus for regenerating ion exchange resin of the type wherein the regenerant flows upwardly, countercurrently to a downwardly moving resin bed from a point of entry to a point of withdrawal, said apparatus including a tank having outlet means for spent regenerant in its upper portion, means for introducing spent resin into said tank at an elevation below said regenerant outlet means, and regenerated resin outlet means from the bottom portion of said tank, improved means for introducing regenerant into said tank, comprising a vertical rotatably mounted hollow shaft extending into said tank, the upper portion of said shaft being connected to a source of regenerant, a distributing arm affixed to and in hydraulic communication with said shaft, means for rotating said shaft and said arm, said arm having discharge means arranged to discharge regenerant in the direction of its rotation, said arm extending horizontally within and substantially across the cross-sectional area of said resin bed at an elevation spaced above said regenerated resin outlet means and sufficiently below said outlet means for spent regenerant for substantial completion of the exchange reaction between said resin bed and said regenerant before said regenerant reaches said regenerant outlet means, and means controlling the rate of discharge of liquid from said discharge means to limit turbulence due to said discharge to a narrow zone above said distributor arm, said tank being free of obstructions to a straight line flow of regenerant, countercurrently to said resin bed, from said discharge means to the top of said resin bed.

5. In a plant for carrying out continuous ion exchange operations of the type wherein the liquid to be treated flows upwardly countercurrently to and through a downwardly moving resin bed in a treating column and regenerant flows upwardly countercurrently to and through a downwardly moving resin bed in a regeneration column, each from its point of entry to its point of withdrawal, and wherein resin withdrawn from the bottom of the treating column is introduced into the top of the regeneration column and resin withdrawn from the bottom of the regeneration column is rinsed and returned to the top of the treating column, each of said columns having upper liquid outlet means and lower resin outlet means from vertically opposite levels, and means for introducing resin vertically spaced from its upper liquid outlet means and its lower resin outlet means, improved inlet means for liquid to be treated and for regenerant in said treating and regeneration columns, respectively, each of said inlet means comprising a rotatably mounted hollow shaft extending into the respective column, a hollow arm affixed to, and in hydraulic communication with, said shaft and extending horizontally therefrom, one of said shafts being connected to a source of the liquid to be treated and the other shaft being connected to a source of regenerant, and means for rotating said shafts, said arms having discharge means arranged to discharge uniformly over the cross-sectional area of said columns, each arm being located in the respective resin bed at an elevation sufficiently spaced from the respective resin outlet means to provide between each arm and the respective resin outlet means a quiescent thickening zone which is in open hydraulic communication with the overlying portion of the respective column, and sufficiently spaced from the respective liquid outlet means to provide a path of flow from its discharge means to the respective liquid outlet means of sufficient length for completion of the exchange reactions in the respective column, means controlling the discharge from each of said discharge means to limit turbulence due to said discharge to a narrow zone above said distributor arm, said columns being free of structure obstructing or deflecting a straight line flow from the respective discharge means through said paths to the respective liquid outlet means.

6. In a method of carrying out continuous ion exchange operations of the type wherein a liquid flows upwardly, countercurrently to a downwardly moving bed of ion exchange material, from a region of liquid introduction to a liquid outlet zone along a path free of obstructions and restrictions, and ion exchange material is continuously added to the top of said bed and is continuously withdrawn from its bottom at the rate at which it is added to its top, the steps of introducing the liquid into a lower region of said bed in such manner and at a rate as to establish a narrow zone of localized turbulence in the said region of introduction of the liquid into the bed and extending substantially across the cross-sectional area of said bed, in which narrow zone agglomerations of particles of ion exchange material are broken up and the particles are cleansed, and a quiescent zone underneath, and in open hydraulic communication with, said region, and to limit the expansion of said bed to maintain the relative vertical positions of the particles of ion exchange material therein, and concentrating the ion exchange material slurry in said quiescent zone before it is withdrawn.

7. In a method of regenerating ion exchange resin wherein the regenerant flows upwardly countercurrently to and through a downwardly moving resin bed from a region of regenerant introduction to a regenerant outlet zone along a path of free of obstructions and restrictions, spent resin slurry is continually added to the top of said bed at a predetermined rate, and a slurry of freshly regenerated resin is continually withdrawn from the lower portion of said bed at the same rate, the steps of introducing the regenerant into said bed in a region intermediate the points of addition of spent resin and of withdrawal of regenerated resin in such manner and at a rate as to cause in said region of introduction of the liquid a localized turbulence extending substantially across the cross-sectional area of said region and sufficient to break up agglomerations of resin particles and cleanse the particles entering said region, but insufficient to disturb quiescent conditions in the zone of said bed between said region and the point of withdrawal of regenerated resin, and thickening the resin slurry in said quiescent zone before its withdrawal.

8. In a method of carrying out continuous ion exchange operations of the type wherein a first resin bed moves downwardly through a treating zone, liquid to be treated flows upwardly, countercurrently to and through said first bed, freshly regenerated resin is continually added to said first bed at the top, and a slurry of exhausted resin is continually withdrawn from the bottom of said treating zone to a dewatering zone, dewatered resin is added to the top of a second downwardly moving resin bed in a regeneration zone, regenerant flows upwardly, countercurrently to and through said second bed, and a slurry of freshly regenerated resin is withdrawn from the bottom of said regeneration zone to a dewatering and rinse zone and thence returned to the treating zone, the improvement comprising moving said beds of ion exchange material by gravity through said treating and regeneration zones, introducing the liquid to be treated and the regenerant into a lower region of said treating and regeneration zones, respectively, and flowing them countercurrently to said beds to an upper withdrawal zone along a path free of obstructions and restrictions to flow, said liquid to be treated and regenerant being introduced in such manner and at such rates as to cause a localized turbulence over the cross-sectional area of the respective region of introduction of liquid to be treated and regenerant, respectively, sufficient to break up agglomerations of resin particles, while maintaining quiescent conditions in the zones of said beds underneath said regions, and to limit expansion of said beds due to the upward rate of flow of the liquid and regenerant, respectively, to maintain the relative vertical positions of the resin particles in said beds, councentrating the resin slurries in said quiescent zones underlying said respective regions and withdrawing thickened resin slurries from said quiescent zones to said dewatering and rinse zones, respectively.

References Cited by the Examiner
UNITED STATES PATENTS

| | | | |
|---|---|---|---|
| 2,073,388 | 3/37 | Elliott et al. | 210—189 XR |
| 2,559,518 | 7/51 | Smith | 259—108 XR |
| 2,572,848 | 10/51 | Fitch | 210—33 |
| 2,744,840 | 5/56 | Daniels et al. | 210—189 XR |

MORRIS O. WOLK, *Primary, Examiner.*

CARL F. KRAFFT, *Examiner.*